(12) United States Patent
Huang

(10) Patent No.: US 9,399,727 B2
(45) Date of Patent: *Jul. 26, 2016

(54) COMPOSITION AND METHOD FOR PRODUCING AN ULTRA-LIGHTWEIGHT CERAMIC PROPPANT

(71) Applicant: PROP Supply and Service, LLC, Houston, TX (US)

(72) Inventor: Zhijie Huang, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,578

(22) Filed: Apr. 8, 2014

(65) Prior Publication Data

US 2014/0216741 A1 Aug. 7, 2014

Related U.S. Application Data

(63) Continuation of application No. 13/386,143, filed as application No. PCT/US2010/042980 on Jul. 23, 2010, now Pat. No. 8,727,003.

(60) Provisional application No. 61/228,562, filed on Jul. 25, 2009.

(30) Foreign Application Priority Data

Apr. 27, 2010 (CN) .......................... 2010 1 0157346

(51) Int. Cl.
```
E21B 43/26      (2006.01)
C09K 8/66       (2006.01)
C04B 33/13      (2006.01)
C04B 33/24      (2006.01)
C04B 35/626     (2006.01)
C04B 38/00      (2006.01)
C09K 8/80       (2006.01)
E21B 43/267     (2006.01)
```
(52) U.S. Cl.
CPC ............... *C09K 8/665* (2013.01); *C04B 33/13* (2013.01); *C04B 33/24* (2013.01); *C04B 35/62695* (2013.01); *C04B 38/009* (2013.01); *C09K 8/80* (2013.01); *E21B 43/267* (2013.01); *C04B 2235/3201* (2013.01); *C04B 2235/3206* (2013.01); *C04B 2235/3208* (2013.01); *C04B 2235/3232* (2013.01); *C04B 2235/3272* (2013.01); *C04B 2235/528* (2013.01); *C04B 2235/5296* (2013.01); *C04B 2235/5427* (2013.01); *C04B 2235/72* (2013.01); *C04B 2235/77* (2013.01); *C04B 2235/9692* (2013.01); *E21B 43/26* (2013.01)

(58) Field of Classification Search
CPC ....... E21B 43/267; E21B 43/26; E21B 34/14; E21B 43/14
USPC .................. 166/308.1, 280.2, 280.1
See application file for complete search history.

(56) References Cited

U.S. PATENT DOCUMENTS

| | | | |
|---|---|---|---|
| 5,188,175 A * | 2/1993 | Sweet ..................... | 166/280.2 |
| 5,597,784 A * | 1/1997 | Sinclair et al. ............. | 166/280.2 |
| 7,713,918 B2 * | 5/2010 | Stephenson et al. .......... | 507/269 |
| 2006/0177661 A1 * | 8/2006 | Smith et al. .................. | 428/403 |
| 2008/0058228 A1 * | 3/2008 | Wilson .......................... | 507/140 |

* cited by examiner

*Primary Examiner* — Zakiya W Bates
*Assistant Examiner* — Silvana Runyan

(57) ABSTRACT

A pellet made from a mixture of natural occurring clays comprising porcelain clay, earthenware clay, and kaolin clay. In some embodiment, the pellet has an alumina content between about 5.5% and about 35%, an apparent specific gravity from about 2.10 to about 2.55 g/cc, and a bulk density of from about 1.30 to about 1.50 g/cc. The pellet is useful in hydraulic fracturing of oil and gas wells, and has greater conductivity than sand at pressures up to 8,000 psi as measured by Stim-Lab after 50 hours and 275° F. on Ohio Sandstone, in the presence of deoxygenated aqueous 2% solution of KCl.

13 Claims, No Drawings

COMPOSITION AND METHOD FOR PRODUCING AN ULTRA-LIGHTWEIGHT CERAMIC PROPPANT

This application is a continuation application of U.S. patent application Ser. No. 13/386,143. The entire disclosures of the preceding patent application are incorporated by reference herein in their entirety.

REFERENCES TO RELATED APPLICATIONS

This application is the continuation application of U.S. patent application Ser. No. 13/386,143, filed on Jan. 20, 2012, entitled "COMPOSITION AND METHOD FOR PRODUCING AN ULTRA-LIGHTWEIGHT CERAMIC PROPPANT," which is the National Stage of Int'l App'l No. PCT/US10/42980, filed Jul. 23, 2010, claiming priority to U.S. provisional application Ser. No. 61/228,562, filed Jul. 25, 2009, and Chinese patent application serial No. 201010157346.4, filed Apr. 27, 2010

BACKGROUND

Hydraulic fracturing is a technical operation designed to enhance oil and gas production. The process normally involves two steps. First, a hydraulic fracture is formed by injecting a fracturing fluid into the well bore at a sufficient rate and pressure to cause the formation cracked thereby allowing the fluid enter and extend the crack further. Next, a solid propping agent or proppant is carried and placed into the formation to "prop" the fracture open and provide a conductive channel for oil and gas. Oil and gas reservoirs with a low capacity for the flow of fluids usually require hydraulic fracturing to make them commercially viable.

Various types of materials can be used as propping agents, such as sand, resin-coated sand, and man-made ceramic proppant, depending on the type of permeability or particle strength needed. A good propping agent must have sufficient strength to resist crushing by the closure stresses of the formation. The deeper the well depth, the stronger the proppant needs to be to resist crushing. The most commonly used proppant is sand, due to its vast availability and low cost. However, for deeper application, sand does not have sufficient strength to resist crushing due to the closure stresses of the formation, and the permeability of sand is often inadequate.

Sintered bauxite, a high-density proppant with apparent specific gravities about 3.50 g/cc, having an alumina content of about 83% is recommended for use in well depths of greater than 15,000 feet.

Intermediate density proppant, e.g., apparent specific gravity from about 3.10 g/cc to 3.45 g/cc, has been found to have sufficient strength to provide adequate permeability at intermediate depths and pressures, and is strong enough to withstand crushing at well depths from about 8,000 to about 12,000 feet.

However, both high-density and intermediate-density proppants require large pumping equipment, high viscosity fracturing fluids and high pumping rates to keep them in suspension during the fracturing operation, and cause greater than normal wear on fluid carrying and pumping equipment.

Because of the disadvantages of high-density and intermediate-density proppants, the efforts to get a lighter density and crush-resistant proppant by using lower alumina material have been taken since 1980s. Additionally, more and more slickwater fracturing and horizontal well applications require lightweight ceramic proppants.

A low density proppant is described in U.S. Pat. No. 4,522,731 and U.S. Pat. No. 5,120,455 to Lunghofer, using kaolin clay having a 50% alumina content. This low density proppant has an apparent specific gravity of less than 3.0 g/cc.

Another lower density proppant, having an apparent specific gravity of from 2.20 g/cc to 2.60 g/cc, is described in U.S. Pat. No. 5,188,175 to Sweet, using raw material with an alumina content of from 25% to 40%.

An even lower density proppant is described in U.S. Pat. No. 7,036,591 to Cannan, having the alumina content between about 40 and 60%, for use in shallow oil and gas wells. To achieve the specific gravity of from about 1.60 g/cc to about 2.10 g/cc, the firing time of the pellet is less than about 30 minutes and the goal is to sinter and obtain crystallization without fully densifying the proppant.

Since most of fracturing operations are in the low depth range where sand is used, it is desirable to provide a lightweight proppant which can be produced from inexpensive, low alumina content, e.g. a naturally occurring clay with alumina content less than 25% and which exhibits conductivity greater than sand when used in low or medium depth applications.

Reducing the alumina content of the particle generally reduces its density. However, there is a real problem with the strength of the proppant when the alumina content gets too low. For this reason, the goal of the industry has been set to develop a low density proppant without sacrificing strength.

The ultra-lightweight proppant of the present invention uses naturally occurring clays, such as porcelain clay, kaolin (or flint clay) as main raw materials, and are less expensive than bauxite. Therefore, it has lower manufacturing cost per pound. Moreover, the naturally occurring clays have more availability than bauxite.

In addition, from end-user's point view in hydraulic fracturing, fewer pounds of ultra-lightweight proppant are required to fill a crack in the formation for a given propping application because of its lower bulk density as compared to high density or intermediate density proppants. This is a significant advantage since proppants are generally sold by weight.

Other advantages of the ultra-lightweight proppant include its capability of using a lower viscosity fracturing fluid, being employed at more economical pumping rates, and causing less wear on fluid-carrying and pumping equipment than those required by high or intermediate density proppant.

SUMMARY OF THE INVENTION

This invention discloses an ultra-lightweight proppant made from naturally occurring clays having a alumina content from about 5.5% to 35%, preferably from 5.5% to 25%, most preferably from 14% to 25%. The proppant of this invention has an apparent specific gravity of from about 2.10 g/cc to about 2.55 g/cc, preferably 2.30 to 2.50 g/cc; and a bulk density of from about 1.30 g/cc to about 1.50 g/cc, preferably from 1.30 to 1.40 g/cc. The proppant of this invention exhibits greater conductivity than sand at pressures up to 8,000 psi after 50 hours and 275° F. on Ohio Sandstone, in the presence of deoxygenated aqueous 2% solution of KCI evaluated by of STIM-Lab.

In one embodiment, the proppant of this invention may be made from a mixture comprising 5% to 85% of porcelain clay, 5% to 85% kaolin clay and 5% to 30% earthenware clay. The mixture has an alumina content from about 5.5% to 35%, preferably from 5.5% to 25%, most preferably from 14% to 25%.

In some preferred embodiment, the proppant of this invention has a silicon dioxide (SiO2) content between 89.5% and 69.5%, preferably between 81.5% to 69.5%.

This invention further discloses a sintered spherical pellet having a substantially round and spherical shape that manures at least about 0.8 on the Krumbein/Sloss Roundness and Sphericity Chart. The alumina content of said pellet is from about 5.5% to 35% percent, preferably from 5.5% to 25%, and most preferably from 14% to 25%. The pellet of this invention has an apparent specific gravity of from about 2.10 g/cc to about 2.55 g/cc, preferably 2.30 to 2.50 g/cc; and a bulk density of from about 1.30 g/cc to about 1.50 g/cc, preferably from 1.30 to 1.40 g/cc.

This ultra-lightweight proppant can be employed in hydraulic fracturing as well as gravel packing media for sand control in oil and gas wells. It exhibits greater conductivity than sand at pressures up to 8,000 psi after 50 hours and 275° F. on Ohio Sandstone, in the presence of deoxygenated aqueous 2% solution of KCI evaluated by of STIM-Lab.

In order to obtain the maximum strength of proppant particle, the pellets are sintered at firing time from about 75 minutes to about 960 minutes, preferably from about 120 minutes to about 720 minutes, via tunnel kiln or rotary kiln. Generally, the firing temperature is from about 1150° C. to about 1380° C., preferably between 1200° C. to 1320° C.

This invention further discloses a method of fracturing a subterranean formation which comprises injecting a hydraulic fluid into the formation at a rate and pressure sufficient to open a fracture therein, and injecting into the fracture a fluid containing sintered spherical pellets disclosed in this invention.

DETAILED DESCRIPTION

The ultra-lightweight proppant of this invention is in the form of solid, spherical pellets made from mixtures of naturally occurring clays having an alumina content from about 5.5% to about 35%, preferably from 5.5% to 25%, most preferably from 14% to 25%. The proppant of this invention has an apparent specific gravity of from about 2.10 g/cc to about 2.55 g/cc, preferably 2.30 to 2.50 g/cc; and a bulk density of from about 1.30 g/cc to about 1.50 g/cc, preferably from 1.30 to 1.40 g/cc. The proppant of this invention exhibits greater conductivity than sand at pressures up to 8,000 psi after 50 hours and 275° F. on Ohio Sandstone, in the presence of deoxygenated aqueous 2% solution of KCI evaluated by of STIM-Lab. All percentages used in this invention are weight percentages.

In one embodiment, the proppant of this invention may be made from a mixture comprising 5% to 85% porcelain clay, 5% to 85% Kaolin clay and 5% to 30% earthenware clay. The mixture has an alumina content from about 5.5% to 35%, preferably from 5.5% to 25%, most preferably from 14% to 25%.

Raw Materials

In accordance with this invention, one such raw material is porcelain clay. Porcelain clay is a fine soil usually in white color formed from the weathering of aluminous minerals, such as feldspar or china stone. The toughness, strength, and translucence of porcelain clay arise mainly from the formation of glass and the mineral mullite within the fired body at these high temperatures. Porcelain clay generally has an alumina content less than about 20% and a silica content greater than about 65%. The percentages are expressed herein on a dry weight basis.

The second raw material is used for this invention is earthenware clay. Earthenware clay is a very fine-grained soil that is plastic and sticky when moist but hard when fired. Earthenware clay exhibits better plasticity than porcelain clay and kaolin when mixed with water in certain proportions. When dry, the earthenware clay becomes firm and when fired in a kiln, permanent physical and chemical reactions occur. These reactions, among other changes, cause the earthenware clay to be converted into a strong ceramic material. Because of these properties, especially the plasticity, earthenware clay is an excellent raw material to be used for making green pellets of proppants. Earthenware clay generally has an alumina content less than about 25% and a silica content greater than about 60%.

The third main raw material is kaolin. Kaolin, or china clay, generally has an alumina content about 40%, and a silica content about 45%. In chemical composition, kaolin clay consists largely of kaolinite which the formula of the mineral is $(Al_2O_3.2SiO_2.2H_2O)$. Kaolin is a highly refractory clay and has a melting point above 1700° C. Used by itself, kaolin is difficult to shape into pellets because of its poor plasticity, and also, because of its refractoriness, it is difficult to be sintered by firing to a hard, dense particle. To make proppant, kaolin is seldom used by itself; therefore, porcelain and earthenware clays have to be added to it to increase its workability and to lower the kiln temperature necessary to produce a hard and dense proppant.

Porcelain clay, earthenware clay and kaolin used in this invention are from Wanyao, Ningde City, Fujian Province in China (They have been recognized as "Ningde Porcelain Clay", "Ningde Earthenware Clay" & "Ningde Kaolin" respectively). Another source of porcelain clay, earthenware clay and kaolin suitable to make this proppant is minded in Wanwu, Fuan City, Fujian Province in China (They have been recognized as "Fuan Porcelain Clay", "Fuan Earthenware Clay" & "Fuan Kaolin" respectively). Both Ningde and Fuan are places in China with long history of making ceramic products for household and industrial applications. For example, Wangyao, literally means "the Kiln of Bowl", is famous of making various household utensils, such as bowl, urn, and pottery, etc. The principal uses of Fuan clays are in the manufacture of pottery, firebrick and of various products used in the metalworking industries, such as crucibles, saggers, retorts, etc. The amount of free sand (i.e. quartz) of both Ningde and Fuan clays is less than 2 weight percent (hereinafter "w/o").

To make the proppant of this invention, here kaolin can be replaced with flint-clay. Flint-clay is a calcined fireclay with high refractoriness, and should contain high percentages of silica and alumina, with as little as possible of such impurities as lime, magnesia, soda, and potash, which lower the fusion point of the clay. Flint-clay generally has an alumina content about 45%, and a silica content greater than about 40%.

Because kaolin (or flint-clay) has a high enough alumina content, it shall be mixed with porcelain clay and earthenware clay composed largely of silicon dioxide to obtain a mixture having a content of between 5.5% and 35% alumina, preferably from 5.5% to 25%, and most preferably from 14% to 25%.

In one embodiment, the weight percentage of the raw material mixtures is as follows:
Porcelain Clay: 5%~85%
Kaolin (and/or Flint-clay): 5%~85%
Earthenware Clay: 5%~30%

The main impurities of porcelain clay, earthenware clay and kaolin (or flint-clay) are compounds of titanium, iron, and small amounts of potassium and magnesium.

In some preferred embodiment, the raw material mixture may further comprises strengthening additives selected from titanium concentrate, zircon sand, aluminum oxide or combinations thereof. The weight percentage of the strengthening additives is about 5% to about 10%.

The ultra-lightweight proppant disclosed in this invention may also be made from other naturally occurring clays having a alumina content from about 5.5% to 35%, preferably from 5.5% to 25%, most preferably from 14% to 25%.

Term Introduction

For the purposes of this invention, the term "sand" is used to refer to premium quality "Ottawa" sand having a 20/40 mesh size.

The term "conductivity" used in this invention is to refer to width of the fracture multiplied by the permeability of the proppant pack. The conductivity of a proppant under specific conditions of stress, temperature, corrosive environment and time is the single most important measure of proppant's quality.

The conductivity of a packed proppant is defined as the permeability of the proppant pack multiplied by the width of the propped fracture and is usually stated in units of millidarci-feet ("md-ft").

The term "permeability" as used herein is a measure of the ability of media to transmit fluid through pore spaces. Generally, the data of conductivity or permeability is one of the best indicators of its crush strength, and it can provide valuable information about the performance of proppant in the subterranean formation.

The term "sphericity" used in this invention is to measure of how close a proppant particle approaches the shape of a sphere. The term "roundness" as used herein is a measure of the relative sharpness of proppant corners, or of proppant curvature. A chart developed by Krumbein and Sloss has been widely used in the visual estimation of sphericity and roundness since 1963. Both sphericity and roundness should be determined, recorded, and average numbers should be calculated for the sample.

The term "apparent specific gravity" is the weight per unit volume (grams per cubic centimeter) of the particles, including the internal porosity. The apparent specific gravity for a variety of commercially available proppants is given in Table I.

TABLE I

| Commercial Proppants | Bulk Density (g/cc) | Apparent Specific Gravity (g/cc) |
| --- | --- | --- |
| 20/40 High Density Ceramic | 2.02 | 3.50 |
| 20/40 Intermediate Density Ceramic | 1.88 | 3.25 |
| 20/40 Lightweight Ceramic | 1.57 | 2.71 |
| 20/40 Resin Coated Sand | 1.60 | 2.61 |
| 20/40 Ottawa Sand | 1.60 | 2.62 |

The term "bulk density" is the weight per unit volume (grams per cubic centimeter) including the void spaces between the particles in the volume considered. The bulk density for a variety of commercially available proppants is given in Table I.

Generally, the production method of this invention involves 7 steps: raw material calcination, blending & grinding, pellet formation, drying & preheating, sintering, cooling and final screening. The following is the process description in detail.

Raw Material Calcination

Prior to formation of the pellets, kaolin can be either calcined or uncalcined. Porcelain clay and enthenware clay do not need to be calcinated. If kaolin is calcined, the calcination should be performed at the temperature about 1100° C. The calcination temperature is so high that it is not just a thermal treatment process in order to bring about a thermal decomposition, like removing organics, and driving off the water of hydration and moisture, but also a phase transformation process to undergo to form mullite or crystobalite.

Blending & Grinding

The kaolin shall be blended with uncalcinated and milled porcelain clay and earthenware clay. The alumina content of mixture shall be less than 35%. When the mixture having an alumina content less than 35%, it is ground into a mean particle size of approximately 3 to 5 microns to form a dry powder prior to formation of the pellets.

Pellet Formation

Various methods of pellet formation can be used, and are well known in the proppant manufacturing industry, e.g. a method is described in U.S. Pat. No. 4,522,731 using a spray pelletizer or fluidizer. Here, we describe a method using mixer as below.

A mixing machine, or mixer, obtained from Yixing Zhengda Ceramic Equipment, Inc, can rotate at a speed of from about 10 to 120 revolutions per minute (rpm). Then, additional ground and dry clay powder is continually added and mixed, forming spherical pellets until the desirable size of green pellets is obtained. Only when the right amount of water and powder are added under the right rate and right time, the process can yield smooth, spherical, well-compacted, solid proppant green pellets.

According to this invention, after sintering, the proppant particles are solid, spherical, and homogeneous in color.

Surprisingly and unexpectedly, it has been found that, to make the proppants of this present invention, it is not necessary to add any binding materials, or binders. The roundness and sphericity can be achieved at least about 0.8 based on the Krumbein/Sloss Roundness and Sphericity Chart.

Drying & Preheating

The spherical pellets are next discharged from the mixer and dried to a free moisture content of less than 3%. The suitable drying temperature is about 300° C. to about 400° C. and the time is for 30 minutes to 45 minutes. Once dried, the desired size spherical pellets are separated by screening to different sizes. The pellets of undesirable sides will be screened out and recycled.

Sintering

Soon after the dried green pellets are screened in the desired size range, they will be sintered in a rotary kiln or a tunnel kiln. The sintering time and temperature for rotary or tunnel kiln are critical. There are several variables, including raw material mineralogy, milled particle size, pellet size and the volume of material in the kiln, to decide the sintering time and temperature.

1) Sintering via Rotary Kiln

Generally, the firing temperature is from about 1150° C. to about 1380° C., preferably between 1200° C. to 1320° C. The firing time is from about 75 minutes to about 960 minutes, preferably from about 120 minutes to about 720 minutes.

It has been found, for instance, that the strength of particle with firing time of 120 minutes is greater than the strength of particle with firing time of 35 minutes.

Also, applicants found in accordance with this invention that if the firing temperature is too high, e.g. over 1450° C., the particles will be poorly shaped and pellets will stick together due to the low alumina ($Al_2O_3$) content.

2) Sintering via Tunnel Kiln

The tunnel kiln is a car pushing type continuous kiln consists of preheating, drying, firing and cooling zones. It is suitable for a large production of ceramic proppants. It is a flow line production method and the truck of loaded green pellet is loaded every hour or so into one end and removed from the other. A pusher device gradually pushes the newly introduced truck and a row of others in front of it—one truck length and then retracts to permit another load to be charged. The firing zone is at the centre of the tunnel and is maintained at temperature for weeks, months or years, or until maintenance requires a shutdown.

There are several advantages of proppant production in a tunnel kiln than in a rotary kiln. First of all, the processes of preheating, drying, firing, cooling are happened in a tunnel, a closed loop system. Such tunnel structure absorbs and keeps a lot of heat, and it is easier to set up a temperature and control the firing time. Secondly, since it is a continuous operation, the proppant quality is stable and easy to be improved. Thirdly, because the pellet is almost in "static" position during the heating and firing, the particle is able to keep smooth, spherical, and good shape. Finally, the production is more flexible than rotary kiln and can be adjust from monthly volume 3,000 metric ton to monthly volume 6,000 metric ton just according to market demand.

Similar to rotary kiln process, the preheating and drying temperature is about 300° C. to about 400° C. and the time is about 30 minutes to 45 minutes.

After pellet is dried and preheated, it enters into the firing zone that is at the centre of the tunnel. Generally, the firing temperature is from about 1150° C. to about 1380° C., preferably between 1200° C. to 1320° C. The firing time is from about 75 minutes to about 960 minutes, preferably from about 120 minutes to about 720 minutes. As a result, the particle is fully densified and well-shaped.

Also, applicants found that if the firing temperature is too high, e.g. over 1450° C., the particles will be poorly shaped and pellets will stick together due to the low alumina ($Al_2O_3$) content.

Cooling and Screening

After sintering in rotary kiln or tunnel kiln, the pellets are cooled down to air temperature about 28° C. and again screened to the desired final sizes, such as 20/40, 40/70 mesh sizes.

After sintering, the pellets are again screened to the desired final size. For example, a typical size is 40/70 mesh which contains 90 w/o of its pellets of between 0.425 μm and 0.212 μm in size.

The proppants of the preferred embodiment of the present invention have Specific Gravity (oil per ISO 13503-2) of between 2.10 to 2.55 g/cc, preferably between 2.30 to 2.50 g/cc, and Bulk Density of between 1.30 to about 1.50 g/cc, preferably between 1.30 to 1.40 g/cc.

The proppant particles of this invention are homogeneous in color.

The invention is further illustrated by reference to the following non-limiting examples wherein all percentages are by weight unless otherwise specified.

Example 1

A mixture consisting of 52% of porcelain and 26% kaolin were added to 22% of earthenware clay powder. Here, the kaolin has been calcined and ground. And then mixed with powder of uncalcined porcelain and earthenware clays. All raw materials were minded from Wanyao, Ningde, Fujian province in China.

As an example of this invention, the resulting mixture has an alumina content of 23.36%. The detail composition is as follows.

| Chemistry | Mixture (%) |
|---|---|
| $Al_2O_3$ | 23.36 |
| $SiO_2$ | 70.68 |
| $Fe_2O_3$ | 2.04 |
| $K_2O$ | 2.11 |
| $TiO_2$ | 1.16 |
| MgO | 0.30 |
| $CaO_2$ | 0.15 |
| $Na_2O$ | 0.18 |
| Others | 0.02 |

The resulting mixture was granulated in a mixer provided by Yixinfg Zhengda Ceramic Equipment, Inc. The mixer speed was about 25 rpm, and the total granulation time was about 75 minutes for 40/70 mesh size.

The resulting granulated material was dried in the heater (or dryer) at temperature of 350° C., and then was sintered at a temperature of 1275° C.

The resulting proppant of Example 1 was 40/70 mesh in size, and has been tested by Stim-Lab, a Core Laboratories Company, located in Duncan, Okla. The testing results of Stim-Lab exhibited a bulk density of 1.34 $g/cm^3$ and, a specific gravity of 2.42 $g/cm^3$, and a crushing strength of 2.7% fines at 7,500 psi, and 6.7% fines at 10,000 psi.

The following is summary of proppant properties in 40/70 mesh size evaluated by STIM-Lab, and the test procedure is based on ISO 13503-2:

| ITEM | TEST RESULT | UNIT |
|---|---|---|
| Sphericity | 0.9 | n/a |
| Roundness | 0.9 | n/a |
| Acid Solubility | 4.0 | % |
| Turbidity | 18 | FTU |
| Bulk Density | 1.34 | $g/cm^3$ |
| Specific Gravity | 2.42 | $g/cm^3$ |
| Crush Test @ 7,500 psi | 2.7 | % |
| Crush Test @ 10,000 psi | 6.7 | % |

Stim-Lab has developed testing techniques for determining the conductivity and permeability of proppant that are widely accepted in the industry.

After evaluated by STIM-Lab, it has been found that the proppants of this present invention have conductivity that is higher than Sands which have higher specific gravities. For example, the conductivity of the 40/70 proppant of the preferred embodiment of the present invention are at least 560 md-ft, and preferably at least 580 md-ft, after 50 hours at 8000 psi and 275° F., with 2% KCI and deoxygenated with nitrogen, as measured by STIM-Lab ("STIM-Lab Method").

The following are procedures for conductivity and liquid permeability measurements for this invention:

1. The equipment used for the measurement of conductivity and liquid permeability included:

75 ton Dake Press with air oil intensifier. API SS316 or Monet K-5000 flow cells with 10 sq in. flow paths.

Rosemont (smart family) 40:1 pressure transducers for measuring pressure drop and reate plumbed with ¼ in. lines and calibrated with the smart system computer and set at the 0-5 inch of water span range.

Two gallon nitrogen driven fluid reservoirs filled with 2% KCl and deoxygenated with nitrogen.

Internal gauges and calipers for measuring widths.

IBM PC to process data and calculate conductivity and permeability.

Two—10 sq in. Ohio Sandstones.

An API cell was loaded with proppant sample to be tested. The proppant was leveled with a blade device.

2. The proppant sample was placed between the core slabs and was made a part of a four-cell stack.

3. The cells were stacked to within 0.002 in. from top to bottom and positioned between the platens of the Dake Press. Pressure was increased to 500 psi and the system was evacuated and saturated with water at 70-75° F.

4. Once saturated, the closure pressure was increased to 1,000 psi, at a rate of 100 psi/min the proppant was allowed to equilibrate as outlined in the data tables.

5. The flow rate, pressure differential, and average width were measured at each pressure in order to calculate conductivity and permeability. Five measurements were taken and averaged to arrive at each conductivity. Flow rate was measured with a LiquiFlow meter, which was calibrated with a Mettler balance to 0.01 ml/min Darcy's law was used for the calculations to determine the conductivity and permeability.

6. The test temperature was increased to 250° F. and allowed to equilibrate. The temperature was left at 250° F. for 12 hours prior to increasing the closure.

7. The conductivity and permeability of the proppant were collected at 1,000 psi at both room temperature and 250° F. as stated in the data tables.

8. The pressure was increased at 100 psi per minute at 1,000 psi increments and the above measuring technique repeated.

9. The conductivity and permeability of the proppant were continuously monitored at 2,000 psi and 250° F. for 50 hours.

10. The conductivity and permeability of the proppant were continuously monitored at 4,000 psi and 250° F. for 50 hours.

11. The conductivity and permeability of the proppant were continuously monitored at 6,000 psi and 250° F. for 50 hours.

12. The conductivity and permeability of the proppant were continuously monitored at 8,000 psi and 250° F. for 50 hours.

For example, the conductivity of the 40/70 proppant of the preferred embodiment of the present invention are at least 560 md-ft, and preferably at least 580 md-ft, after 50 hours at 8000 psi and 275° F., with 2% KCl and deoxygenated with nitrogen, as measured by STIM-Lab (report No. SL 8674).

| Hours at Closure & Temperature | Closure (psi) | Temperature (° F.) | Conductivity (md-ft) | Width (in) | Permeability (Darcy) |
|---|---|---|---|---|---|
| 50 | 2000 | 250 | 1925 | 0.253 | 91 |
| 50 | 4000 | 250 | 1534 | 0.248 | 74 |
| 50 | 6000 | 250 | 1085 | 0.242 | 54 |
| 50 | 8000 | 250 | 583 | 0.233 | 30 |

Remarks: 40/70 Ultra-Lightweight Ceramic Proppant. Proppant Concentration 2.0 lb/ft2. Between Ohio Sandstone Core. Evaluated by STIM-Lab using the STIM-Lab Method.

Example 2

The same raw materials and production method were repeated as described in Example 1. This time the proppant mesh size was 30/50 which contains 90 w/o of its pellets of between 0.600 μm and 0.300 μm in size. To obtain the green pellets in desirable size, the mixer speed was about 25 rpm, and total granulation time was about 90 minutes.

The following is summary of 30/50 proppant properties evaluated by STIM-Lab, and the test procedure is based on ISO 13503-2:

| ITEM | TEST RESULT | UNIT |
|---|---|---|
| Sphericity | 0.8 | n/a |
| Roundness | 0.8 | n/a |
| Acid Solubility | 4.0 | % |
| Turbidity | 8 | FTU |
| Bulk Density | 1.31 | g/cm$^3$ |
| Specific Gravity | 2.41 | g/cm$^3$ |
| Crush Test @ 7,500 psi | 7.1 | % |

The same Stim-Lab conductivity & property tests described in Example 1 was repeated on the proppant in 30/50 mesh size.

| Hours at Closure & Temperature | Closure (psi) | Temperature (° F.) | Conductivity (md-ft) | Width (in) | Permeability (Darcy) |
|---|---|---|---|---|---|
| 50 | 2000 | 250 | 3216 | 0.256 | 151 |
| 50 | 4000 | 250 | 2350 | 0.249 | 113 |
| 50 | 6000 | 250 | 1378 | 0.239 | 69 |
| 50 | 8000 | 250 | 657 | 0.226 | 35 |

Remarks: 30/50 Ultra-Lightweight Ceramic Proppant. Proppant Concentration 2.0 lb/ft2. Between Ohio Sandstone Core. Evaluated by STIM-Lab using the STIM-Lab Method.

Example 3

A mixture consisting of 65% of porcelain clay and 15% kaolin were added to 20% of earthenware clay. Here, the kaolin powder was uncalcined. As an example of this invention, the resulting mixture has an alumina content of 19.05%. The detail composition is as follows.

| Chemistry | Mixture (%) |
|---|---|
| $Al_2O_3$ | 19.05 |
| $SiO_2$ | 71.60 |
| $Fe_2O_3$ | 2.23 |
| $K_2O$ | 2.08 |
| $TiO_2$ | 1.98 |
| MgO | 1.93 |

-continued

| Chemistry | Mixture (%) |
|---|---|
| $CaO_2$ | 0.45 |
| $Na_2O$ | 0.23 |
| Others | 0.45 |

The same production method was repeated as described in Example 1. The resulting proppant of Example 3 was 40/70 mesh in size, and has been evaluated by the Product Quality Supervision & Inspection Center of PetroChina. The testing results of PetroChina exhibited a bulk density of 1.30 g/cm$^3$ and, a specific gravity of 2.40 g/cm$^3$, and a crushing strength of 4.6% fines at 7,500 psi.

The following is summary of proppant properties tested by PetroChina, and the test procedure is based on ISO 13503-2:

| ITEM | TEST RESULT | UNIT |
|---|---|---|
| Sphericity | 0.88 | n/a |
| Roundness | 0.88 | n/a |
| Acid Solubility | 6.0 | % |
| Bulk Density | 1.30 | g/cm$^3$ |
| Specific Gravity | 2.40 | g/cm$^3$ |
| Crush Test @ 7,500 psi | 4.6 | % |

Here is conductivity test evaluated by PetroChina:

| Closure Pressure (MPa/psi) | Conductivity (md-feet) |
|---|---|
| 10/1450 | 1072 |
| 20/2900 | 938 |
| 30/4350 | 748 |
| 40/5800 | 601 |
| 50/7250 | 367 |
| 60/8700 | 236 |

Remarks: 40/70 Ultra-Lightweight Ceramic Proppant. Proppant Concentration 2.0 lb/ft2. Between Ohio Sandstone Core. Evaluated by PetroChina.

Example 4

The same raw materials and production method was repeated as described in Example 3. The resulting mixture still has an alumina content of 19.05%. This time the proppant mesh size was 20/40 which contains 90 w/o of its pellets of between 0.850 μm and 0.425 μm in size. To obtain the green pellets in desirable size, the mixer speed was about 25 rpm, and total granulation time was about 105 minutes.

The following is summary of 20/40 proppant property data:

| ITEM | TEST RESULT | UNIT |
|---|---|---|
| Sphericity | 0.9 | n/a |
| Roundness | 0.9 | n/a |
| Acid Solubility | 4.2 | % |
| Bulk Density | 1.30 | g/cm$^3$ |
| Specific Gravity | 2.40 | g/cm$^3$ |
| Crush Test @ 5,000 psi | 3.8 | % |
| Crush Test @ 7,500 psi | 9.5 | % |

Example 5

A mixture consisting of 24% of porcelain clay and 59% flint-clay were added to 12% of earthenware clay and 5% of titanium concentrate as additive. Here, the titanium concentrate can be replaced by zircon sand, aluminum oxide or their combinations.

As an example of this invention, the resulting mixture has an alumina content of 34.18%. The detail composition is as follows.

| Chemistry | Mixture (%) |
|---|---|
| $Al_2O_3$ | 34.18 |
| $SiO_2$ | 57.23 |
| $TiO_2$ | 3.38 |
| $Fe_2O_3$ | 2.08 |
| $K_2O$ | 1.01 |
| MgO | 0.47 |
| $CaO_2$ | 0.40 |
| $Na_2O$ | 0.91 |
| Others | 0.34 |

The same production method was repeated to make proppant in 40/70 mesh as described in Example 1. The resulting proppant of 40/70 exhibited a density of 1.40 g/cm$^3$ and, a specific gravity of 2.46 g/cm$^3$, and a crushing strength of 2.36% fines at 7,500 psi, and 5.80% fines at 10,000 psi.

The following is summary of 40/70 proppant property data:

| ITEM | TEST RESULT | UNIT |
|---|---|---|
| Sphericity | 0.8 | n/a |
| Roundness | 0.8 | n/a |
| Acid Solubility | 5.1 | % |
| Turbidity | 15 | FTU |
| Bulk Density | 1.40 | g/cm$^3$ |
| Specific Gravity | 2.46 | g/cm$^3$ |
| Crush Test @ 7,500 psi | 2.36 | % |
| Crush Test @ 10,000 psi | 5.8 | % |

It was observed that after adding the strengthening additives, the 40/70 mesh size has less than about 3% crush rate at 7500 psi, and less than about 6% crush rate at 10000 psi.

Example Summary

The proppant particles of example 1 to 5 are homogeneous in color. The property data of test results are as follows:

| ITEM | Example 1 | Example 2 | Example 3 | Example 4 | Example 5 |
|---|---|---|---|---|---|
| Proppant API Size | 40/70 | 30/50 | 40/70 | 20/40 | 40/70 |
| Alumina Content (%) | 23.36 | 23.36 | 19.05 | 19.05 | 34.18 |
| Silicon Dioxide Content (%) | 70.68 | 70.68 | 71.60 | 71.60 | 57.13 |
| Sphericity | 0.9 | 0.8 | 0.88 | 0.9 | 0.8 |
| Roundness | 0.9 | 0.8 | 0.88 | 0.9 | 0.8 |
| Acid Solubility (%) | 4.0 | 4.0 | 6.0 | 4.2 | 5.1 |
| Bulk Density (g/cm3) | 1.34 | 1.31 | 1.30 | 1.30 | 1.40 |
| Specific Gravity (g/cm3) | 2.42 | 2.41 | 2.40 | 2.40 | 2.46 |
| Crush Test @ 5,000 psi (%) | — | — | — | 3.8 | — |
| Crush Test @ 7,500 psi (%) | 2.7 | 7.1 | 4.6 | 9.5 | 2.36 |
| Crush Test @ 10,000 psi (%) | 6.7 | — | — | — | 5.8 |

The proppant disclosed in this invention in 40/70 mesh size has less than about 5% crush rate at 7500 psi, and less than about 10% crush rate at 10000 psi.; in 30/50 mesh size less than about 10% crush rate at 7500 psi, and less than about 15% at 10000 psi; and in 20/40 mesh size less than about 15% crush rate at 7500 psi, and less than about 20% crush rate at 10000 psi.

It will be obvious to those skilled in the art that the invention described here can be essentially duplicated by making minor changes in the material content or the method of manufacture. To the extent that such material or methods are substantially equivalent, it is intended that they be encompassed by the following claims.

What we claim is:

1. A pellet made from a mixture of natural occurring clays comprising porcelain clay, earthenware clay, and kaolin clay; wherein each of said clay having an alumina content and a silicon dioxide ($SiO_2$) content.

2. The pellet of claim 1, wherein said porcelain clay possesses a weight percentage of at least 5% in said mixture.

3. The pellet of claim 1, wherein the alumina content of said pellet is less than 35%.

4. The pellet of claim 3, wherein the alumina content of said pellet is more than 5.5%.

5. The pellet of claim 4, wherein said pellet has a silicon dioxide ($SiO_2$) content between about 89.5% and 69.5%.

6. The pellet of claim 1, wherein said pellet has an apparent specific gravity from about 2.10 g/cc to about 2.55 g/cc, and a bulk density from about 1.30 g/cc to about 1.50 g/cc.

7. The pellet of claim 1, wherein said pellet exhibits greater conductivity than sand at pressures up to 8,000 psi after 50 hours and 275° F. on Ohio Sandstone, in the presence of deoxygenated aqueous 2% solution of KCl as measured by the Stim-Lab Method.

8. The pellet of claim 1, wherein the pellet in 40/70 mesh size has less than about 5% crush rate at 7500 psi, and less than about 10% crush rate at 10000 psi.

9. The pellet of claim 1, wherein the pellet in 30/50 mesh size has less than about 10% crush rate at 7500 psi, and less than about 15% crush rate at 10000 psi.

10. The pellet of claim 1, wherein the pellet in 20/40 mesh size has less than about 15% crush rate at 7500 psi, and less than about 20% crush rate at 10000 psi.

11. The pellet of claim 1, wherein said pellet consists of solid spherical particles that are homogeneous in color.

12. The pellet of claim 1, wherein said natural occurring clay mixture further comprises a strengthening additive selected from the group consisting of titanium concentrate, zircon sand, aluminum oxide or combinations thereof.

13. A method of fracturing a subterranean formation which comprises injecting a hydraulic fluid into the formation at a rate and pressure sufficient to open a fracture therein, and injecting into the fracture a fluid containing the pellet of claim 1.

* * * * *